United States Patent [19]
Othmer et al.

[11] Patent Number: 5,379,129
[45] Date of Patent: Jan. 3, 1995

[54] METHOD FOR COMPOSITING A SOURCE AND DESTINATION IMAGE USING A MASK IMAGE

[75] Inventors: Konstantin Othmer, San Jose; Bruce A. Leak, Palo Alto, both of Calif.

[73] Assignee: Apple Computer, Inc., Cupertino, Calif.

[21] Appl. No.: 880,623

[22] Filed: May 8, 1992

[51] Int. Cl.$^6$ .............................................. H04N 1/387
[52] U.S. Cl. ...................................... 358/450; 348/659
[58] Field of Search ................ 358/21 R, 22, 30, 160, 358/180, 182, 213, 22, 443, 448, 449, 450, 451, 530, 540, 453

[56] References Cited

U.S. PATENT DOCUMENTS

| | | |
|---|---|---|
| 4,617,592 | 10/1986 | MacDonald .......................... 358/80 |
| 4,779,135 | 10/1988 | Judd ..................................... 358/183 |
| 4,896,208 | 1/1990 | Moriya et al. . |
| 4,954,912 | 9/1990 | MacDonald et al. ................ 358/448 |
| 5,086,434 | 2/1992 | Abe et al. . |
| 5,226,098 | 7/1993 | Hirosawa . |
| 5,267,333 | 11/1993 | Aono et al. . |

*Primary Examiner*—Bentsu Ro
*Attorney, Agent, or Firm*—Mark Aaker

[57] ABSTRACT

This invention provides a method for compositing a source image and a destination image using a mask image to produce a result image in a digital image processing system. The method is, on a pixel-by-pixel basis, using the mask image to select between the source and destination images: where a black color value for a mask pixel selects the color value of the corresponding pixel of the source image; and a white color value for a mask pixel selects the color value of the corresponding pixel of the destination image; and where an intermediate color value for a mask pixel selects a weighted average between source and destination pixel color values. The calculations of the weighted average color value are done in color space, such as on a color component by color component basis. The result image can be displayed or stored for further use. This method can be described in boolean expression according to the formula:

$$result = ((1-mask)*source) + (mask*destination).$$

8 Claims, 3 Drawing Sheets

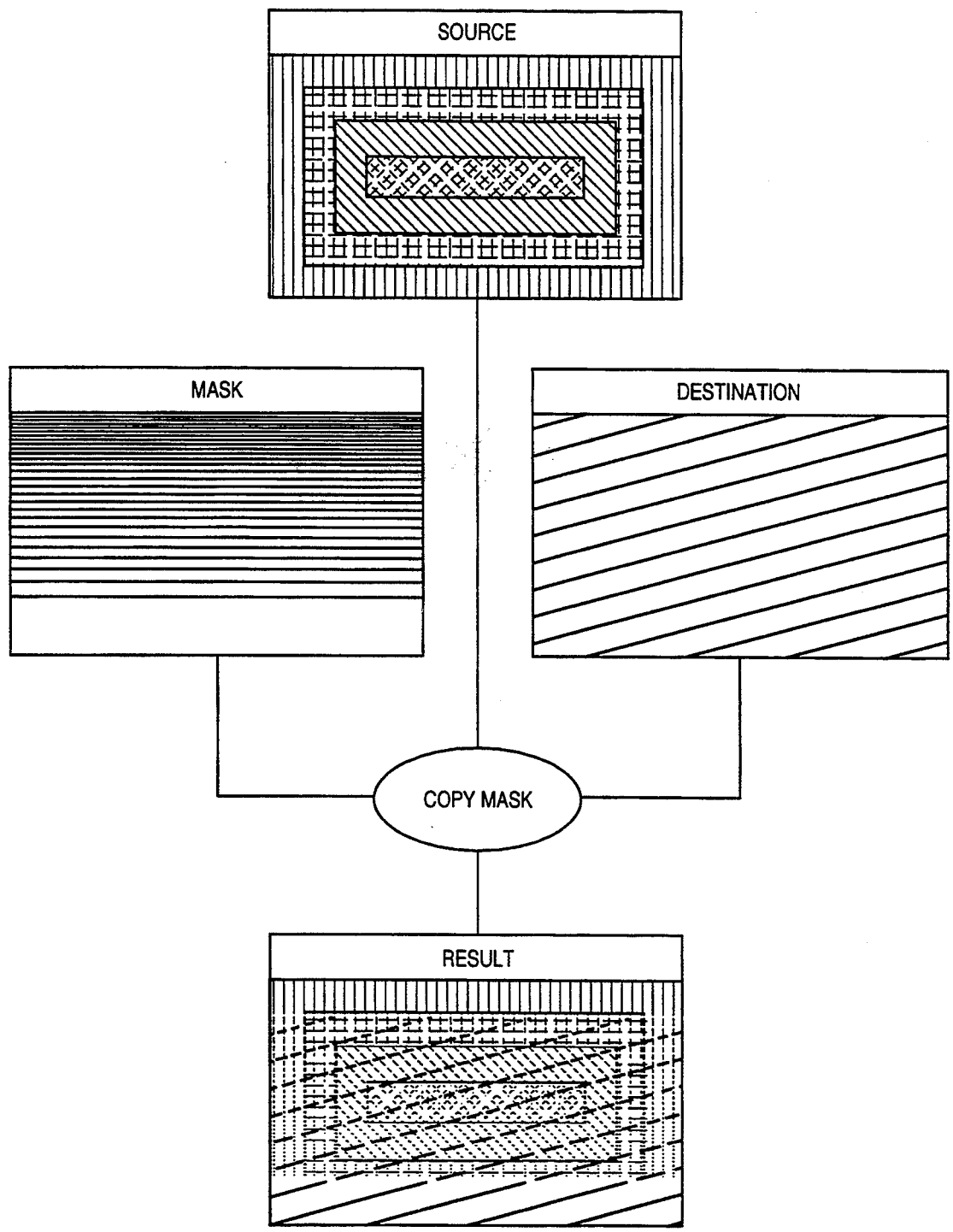
FIG_1

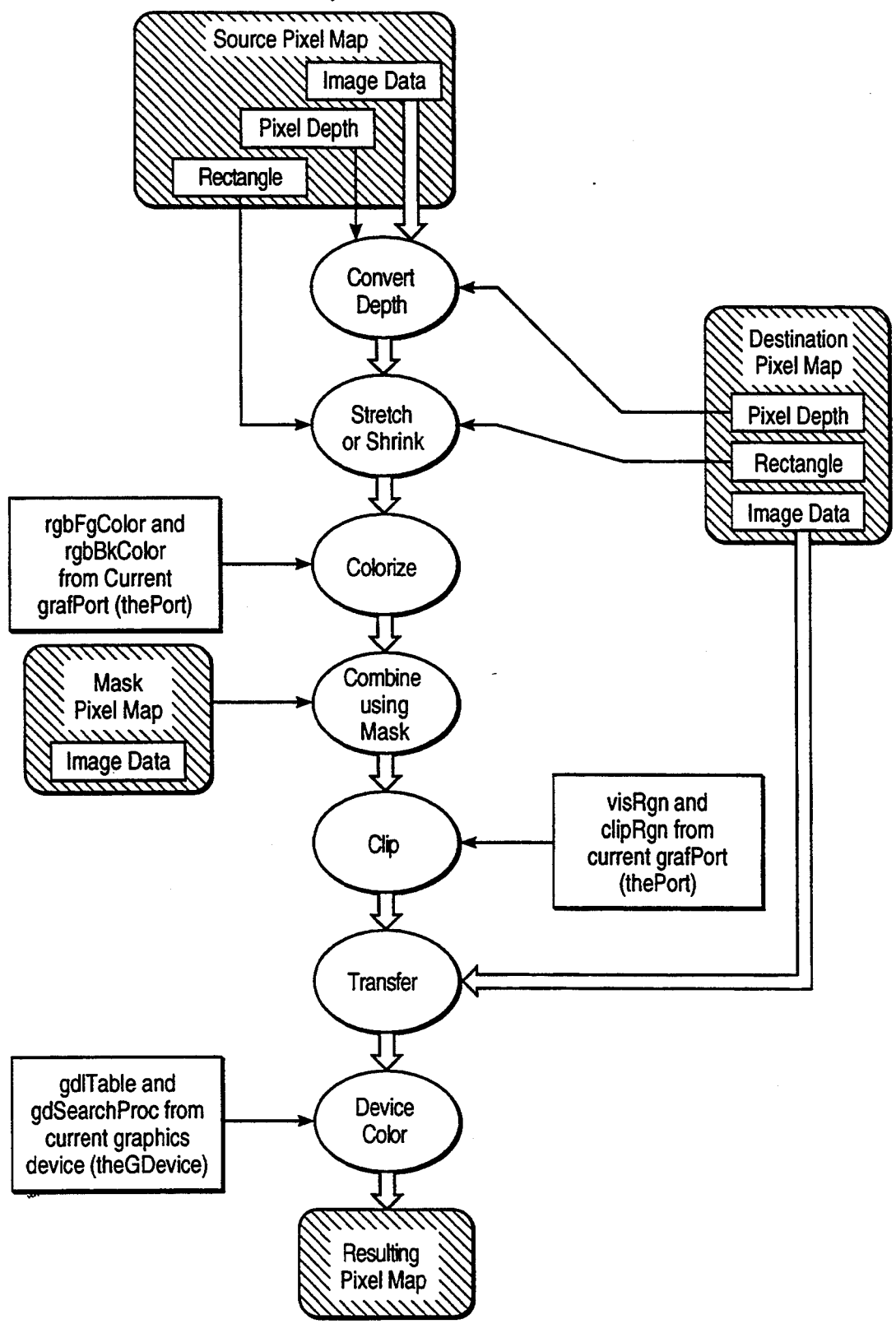
FIG_2

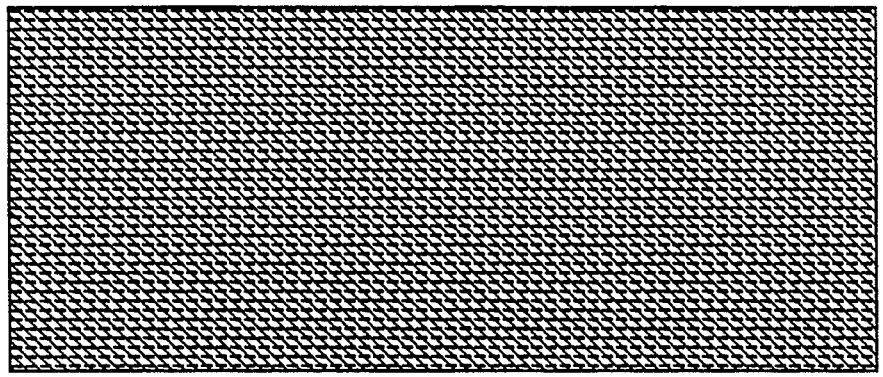
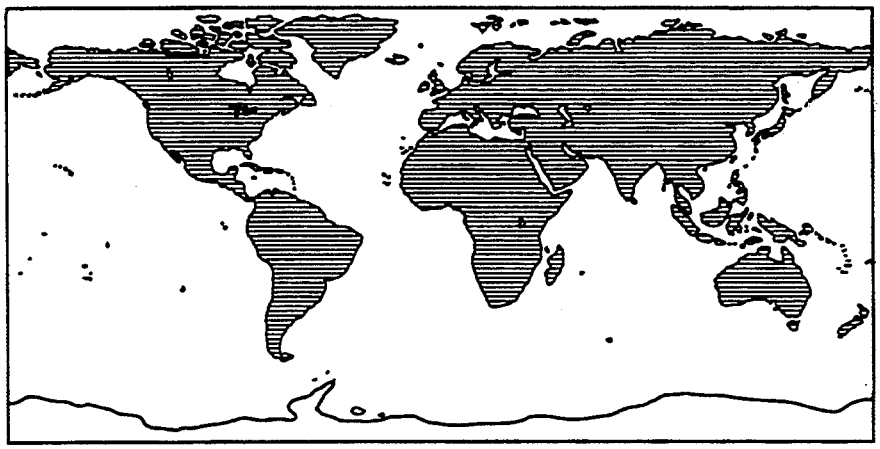
FIG_3

METHOD FOR COMPOSITING A SOURCE AND DESTINATION IMAGE USING A MASK IMAGE

BACKGROUND OF THE INVENTION

This invention relates to a method of combining digital images in a digital color image processing system.

Digital color images can be digitally stored, processed, manipulated, altered and displayed on a digital color imaging system such as computer system including storage, processing capability, and a color CRT display.

A digital color image can be represented as a pixel map having a series of pixels, each pixel holding the color information for a single picture element. As used in this document, a pixel holds a color value relative to a large, abstract "color space" in which computations relating to color information can be performed. A pixel's color value may need to be indexed, altered, or otherwise transformed before it is suitable for use in "display space" for actual output to a display device. A pixel can have its color value represented in color components, such as a red component, green component, and blue component (RGB), which together define the color value held by the pixel.

A source and destination image can be combined or "composited" into a result image in which selected portions of the result image are from corresponding portions of the source image, and the remaining portions of the result image are from corresponding portions of the destination image. In the past, various selection processes have been used, such as methods in which source image replaces destination image in the result image when the source image value for a particular pixel is non-zero. Another method uses a bitmap as a mask, copying from the source where a bit in the bitmap is set (black), and copying from the destination where a bit in the bitmap is clear (white). This method of using a bitmap as a mask is documented in *Inside Macintosh, Volume V*, in Section 4, in particular pages V-70 and V-71, published by Addison-Wesley Publishing Company, Inc., Copyright 1986.

Compositing can also be used to "blend" two images by controlling the degree to which the two images are merged or averaged. This is often done by a method called "alpha channel blending" in which an 8 bit alpha channel controls the blending of two 32 bit RGB images.

However, while these methods have been useful, they are quite rigid and inflexible in accommodating images of various colors and bit depths, and not able to achieve certain desired effects, such as producing anti-aliased compositions with blended or "soft" edges, or in producing images with patterned or pictured text on a background image. What is desired is a compositing operation in which the mask can be a full color image, which accommodates various color and bit depths, can produce anti-aliased, blended edges, and can produce patterned or pictured text on a background image. The method of this invention provides these and other capabilities.

SUMMARY OF THE INVENTION

This invention provides a method for compositing a source image and a destination image using a mask image to produce a result image in a digital image processing system. The method is, on a pixel-by-pixel basis, using the mask image to select between the source and destination images: where a black color value for a mask pixel selects the color value of the corresponding pixel of the source image; and a white color value for a mask pixel selects the color value of the corresponding pixel of the destination image; and where an intermediate color value for a mask pixel selects a weighted average between source and destination pixel color values. The calculations of the weighted average color value are done in color space, such as on a color component by color component basis. The result image can be displayed or stored for further use. This method can be described in boolean expression according to the formula:

$$result = ((1 - mask) * source) + (mask * destination).$$

This method provides a compositing operation in which the mask can be a full color image, which accommodates various color and bit depths, can produce anti-aliased, blended edges, and can produce patterned or pictured text on a background image.

BRIEF DESCRIPTION OF THE DRAWINGS

FIG. 1 shows an illustration of the images used and results obtained by a method in accordance with this invention.

FIG. 2 shows a flow chart description of the method of this invention used as one step in a longer process.

FIG. 3 shows an illustration of using a method in accordance with this invention to produce patterned text on a background image.

DETAILED DESCRIPTION

This invention provides a method for compositing a source image and a destination image using a mask image to produce a result image in a digital image processing system. FIG. 1 shows an illustration of the images used and results obtained by a method in accordance with this invention. A color version of this Figure can be found as Color Plate XXIII in *Inside Macintosh, Volume VI*, published by Addison-Wesley Publishing Company, Inc., Copyright 1991. At the top of FIG. 1 is a source image of concentric rectangles of varying color shades. At the left of FIG. 1 is a mask image which is shaded from black-to-white from top-to-bottom, respectively. At the right of FIG. 1 is a destination image which is a solid, uniform color.

These three images are used in the method of this invention. In the method, labeled in FIG. 1 as "Copy-Mask", a result image is produced, shown at the bottom of FIG. 1 which is a composite of the first three images. The method operates on a pixel-by-pixel basis, using the mask image to select between the source and destination images.

In a preferred implementation, a black color value for a mask pixel selects the color value of the corresponding pixel of the source image. In FIG. 1, the top line of the mask image is black, and selects the corresponding color value from the source image to be output in the result image.

A white color value for a mask pixel selects the color value of the corresponding pixel of the destination image. In FIG. 1, the bottom line of the mask image is white, and selects the corresponding color value from the destination image to be output in the result image.

An intermediate color value for a mask pixel selects a weighted average between source and destination pixel color values. In FIG. 1, the middle lines of the mask image are various shades of gray, and select a weighted average of the source and destination image color values for the result image. Thus, where the lines of the mask images are blacker, a stronger weighting to the source image is given. Where the lines of the mask images are whiter, a stronger weighting to the destination image is given.

The calculations of the weighted average color value for a pixel is done in color space, so that where the pixel's color information is stored in color components such as RGB, the calculation is done on a color component by color component basis. Similarly, the other pixels in the source, mask, and destination images are processed to produce pixel color values for the result image. The aggregation of all result pixels in a pixel map provides a result image which can be displayed or further processed.

This method can be described in boolean expression according to the formula:

$$result = ((1-mask)*source) + (mask*destination)$$

Where: mask is the color value of a mask pixel; source is the color value of a corresponding source image pixel; destination is the color value of a corresponding destination image pixel; and result is the new color value for a corresponding result image pixel. For example; where the mask is black (value 0), the result be selected from the source. Where the mask is white (value 1), the result be selected from the destination.

Of course, other color value encoding methods can be used which will work in similar ways in using the mask image to select between a source and a destination image for compositing into a result image. In particular, CMY and XYZ color encoding methods can be used, and the method of this invention will operate without significant alteration, as the method works on a component-by-component basis. In addition, it should be noted that various color and bit depths can be used for the source, destination, and mask images. This is possible because the calculations are performed on a component-by-component basis, and can be performed on the color values represented by the components, rather than on their particular bit representations. For example, a 16-bit and a 24-bit color representation can be scaled and multiplied to determine color values which can be compared and combined according to this invention before being re-scaled and divided into a particular 16-bit color representation for a result pixel.

In addition, the method of this invention can be selectively applied only to certain components of color images. For example, images can be composited only on their red components, rather than on all three RGB components. This is useful when working with color separations, or with uniform color text or bitmaps in combination with color images. For example, using a 50% red mask will combine 50% of the red component of the source image and 50% of the red component of the destination image as they are transferred to the result image. If the destination image is black, and has no red component, then 50% of the red component of the source images is removed in transfer to the result image.

FIG. 2 shows a flow chart description of the method of this invention used as one step in a longer process. The illustrated process is the CopyMask procedure which is further documented in the previously referenced *Inside Macintosh, Volume VI*, in Section 17, "Color QuickDraw," especially pages 17-12 through 17-17. This procedure converts color images having different color depths, and stretches or shrinks the image to a new rectangle before colorizing. After colorizing, the visible image region is composited with a mask and destination image in accordance with the methods of this invention. The resulting image can then be clipped, other transfer mode processes can be performed, and the colors can be converted to the available colors for a specific output device. Since many of these operations will need to be performed in preparing an image for display, it is convenient to combine these processes in a single procedure.

When using the CopyMask procedure or other process using the method of this invention, a first step is identifying the source, mask, and destination images. This can be conveniently done by a program on the color imaging system making a call which includes as its parameters these identifications. In a next step in accordance with this invention, the processing of the image pixels occurs to create result pixels in a result image to be stored on the color imaging system. The result image can be stored or further processed.

As one simple example of the use of this invention, FIG. 3 shows an illustration of using a method in accordance with this invention to produce patterned text on a background image. In this illustration the source image is a pattern, the mask image is text, and the destination is a picture. When the method of this invention is applied; where there is mask image, the pattern is selected from the source image. Where there is no mask image, the picture is selected from the destination image. Therefore, the result image produced has patterned text on a picture background. This is a desirable effect that is provided by the method of compositing in accordance with this invention. Examples of programming statements and additional information on using this new invention are discussed in the article "Scoring Points with TrueType" in *develop* magazine, Issue 7, Summer 1991, by Apple Computer, Inc., pages 30–47.

In particular, the above-referenced *develop* article also shows the use of the invention to create anti-aliased text on a background image. Previous anti-alias methods have difficulty placing text on a background image. The method of this invention provides a method of compositing two images according to a weighted average controlled by a mask image, which provides the ability to anti-alias or "blend" the edges of the composition, as described in the above-referenced *develop* article. When the method of this invention is incorporated in a longer process as shown in FIG. 2, anti-aliasing can also be enhanced by enlarging the text image and then shrinking it to the desired size with a "dithering" process enabled, before compositing the images.

Other embodiments and variations of the invention will be apparent to one skilled in the art form a consideration of the specification drawings, and claims. In particular, applications to produce anti-aliased compositions and blended or "soft" edges in compositions will be apparent. It is intended that the scope of the invention be limited only by the scope of the following claims.

We claim:

1. A method for compositing a source image and a destination image using a mask image to produce a result image in a digital image processing system comprising: on a pixel-by-pixel basis, using the mask image to select between the source and destination images, where a black color value for a mask pixel selects the color value of the corresponding pixel of the source image, and a white color value for a mask pixel selects the color value of the corresponding pixel of the destination image, and where an intermediate color value for a mask pixel selects a weighted average between source and destination pixel color values, and writing said selected color values to corresponding pixels of the result image.

2. A method as in claim 1 wherein for each pixel, the selections are done in color space on a color component by color component basis.

3. A method as in claim 1 further comprising displaying the result image.

4. A method as in claim 1 wherein said method is applied during an operation of a copy procedure for copying pixels from said source image to said destination image.

5. A method as in claim 4 wherein said copy procedure also includes changing the pixel depth, image size, and visible regions of said destination image.

6. A method as in claim 1 wherein said method produces patterned text in said destination image by performing the method with the source image being a pattern and the mask image being text.

7. A method as in claim 1 wherein said method produces anti-aliased text in said destination image by performing the method with the source image being a pattern and the mask image being anti-aliased text.

8. A method for compositing a source image and a destination image using a mask image to produce a result image in a digital image processing system comprising: on a pixel-by-pixel basis, combining images using boolean expression according to the formula;

$$\text{result} = ((1 - \text{mask}) * \text{source}) + (\text{mask} * \text{destination});$$

wherein for each said pixel, said combining is done in a color space on a color component by color component basis; and displaying the result image.

* * * * *